Figure 1:
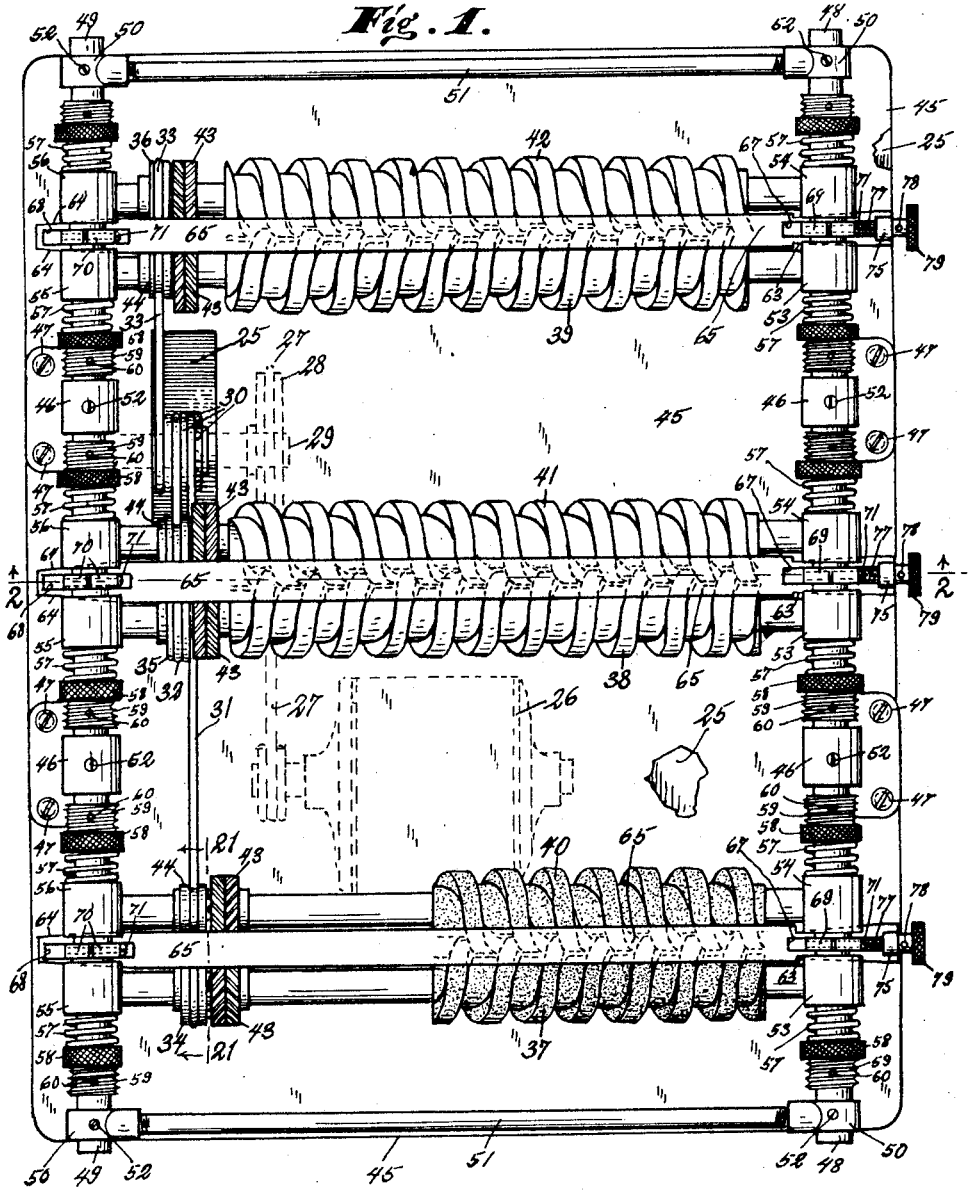

Nov. 5, 1929.  A. A. KOHLMILLER  1,734,494
MACHINE FOR SHARPENING BLADES
Filed July 30, 1927   5 Sheets-Sheet 1

Inventor.
Alfred A. Kohlmiller.
by
Lockwood & Lockwood,
His Attorneys.

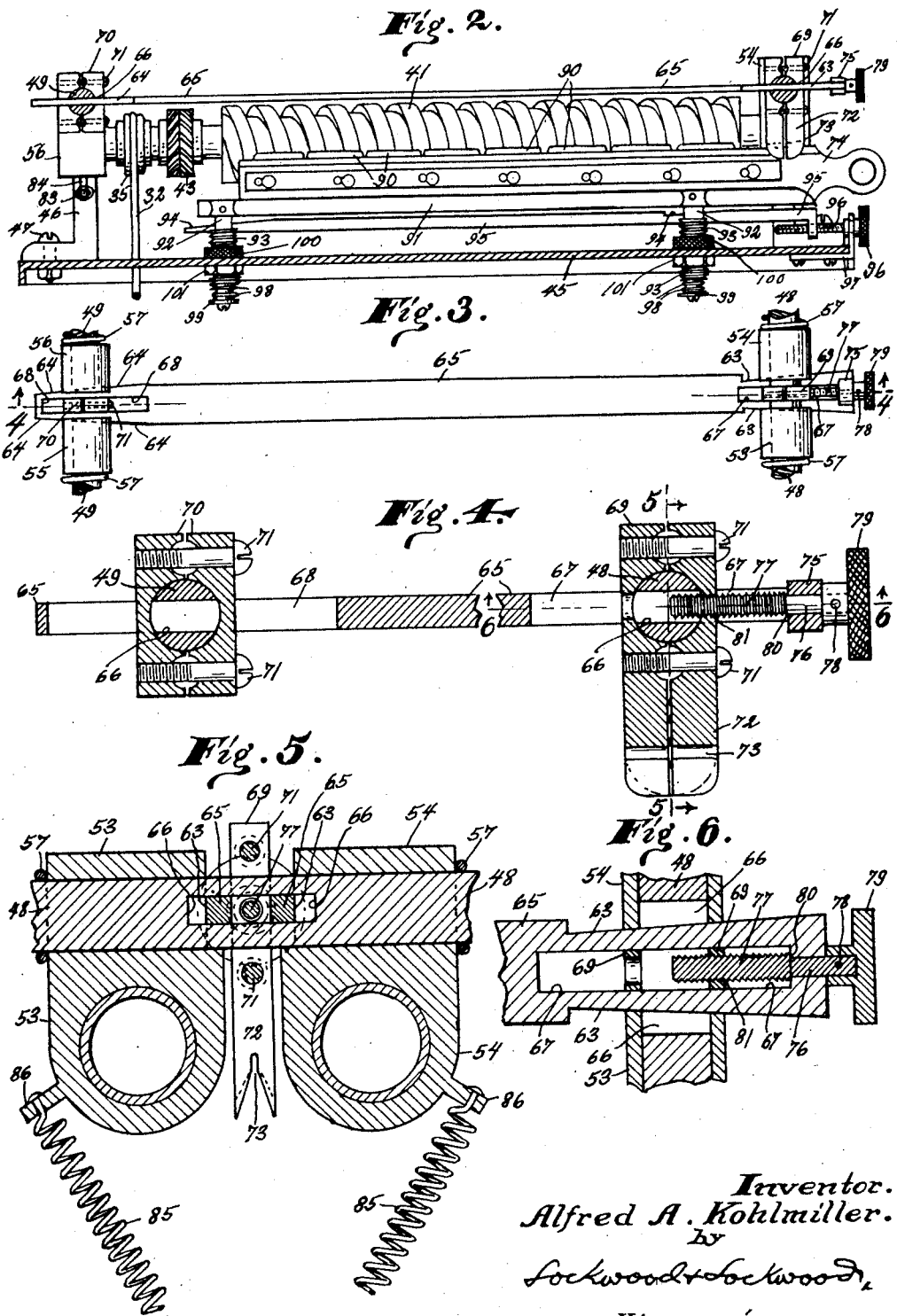

Nov. 5, 1929.  A. A. KOHLMILLER  1,734,494
MACHINE FOR SHARPENING BLADES
Filed July 30, 1927  5 Sheets-Sheet 3
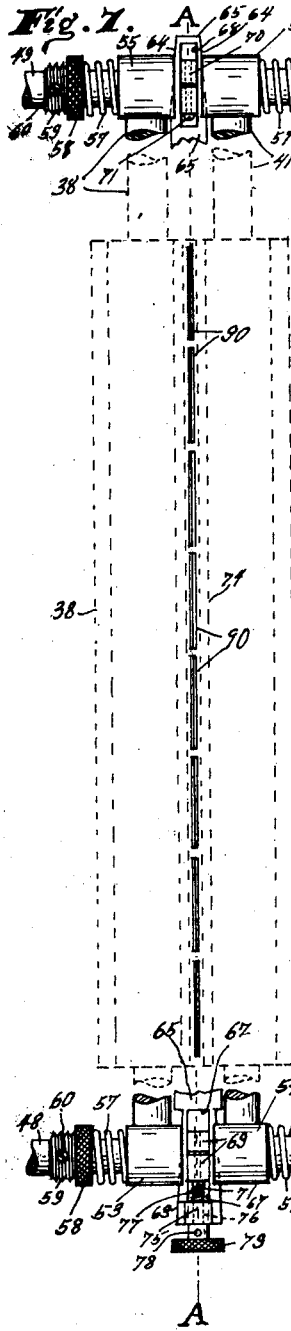
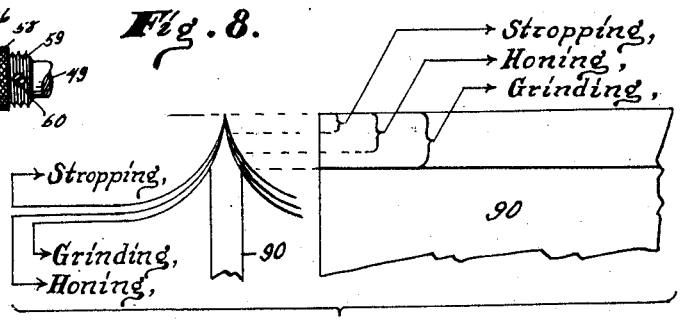
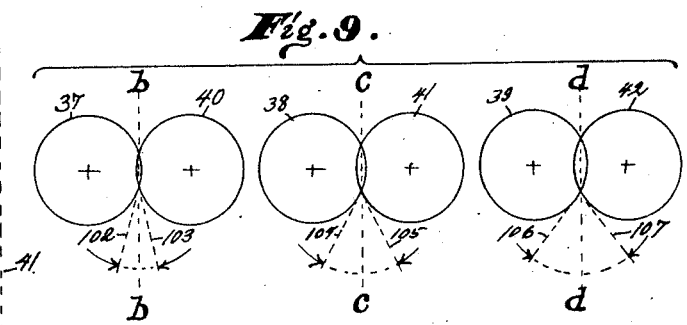
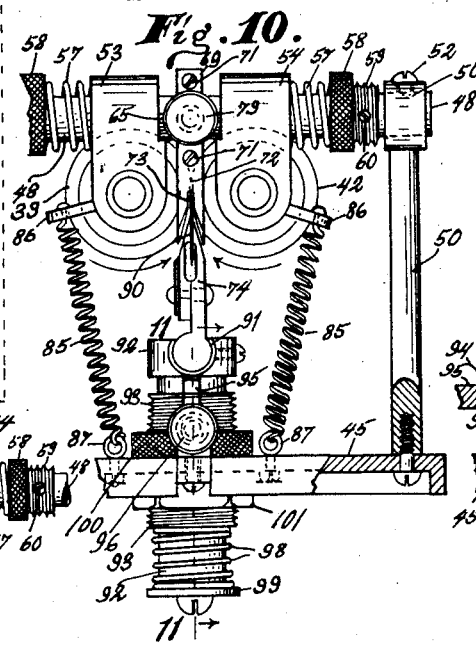
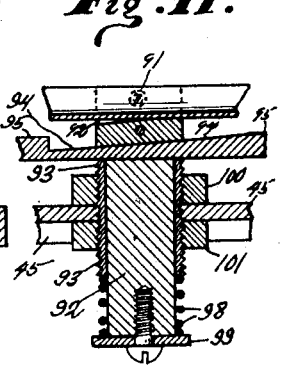
Inventor.
Alfred A. Kohlmiller.
by
Lockwood & Lockwood,
His Attorneys.

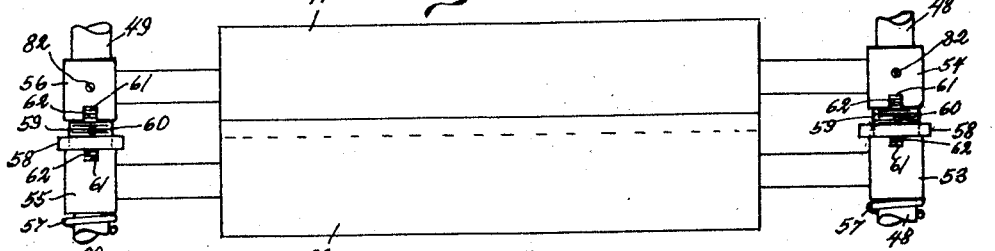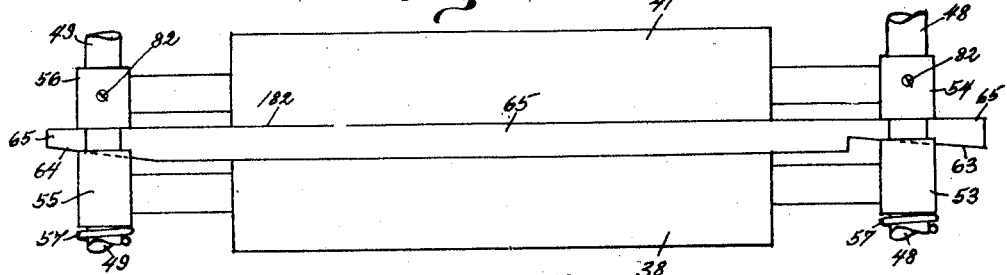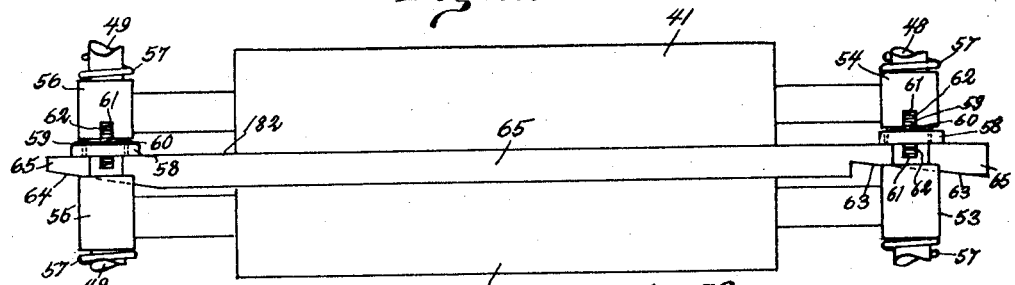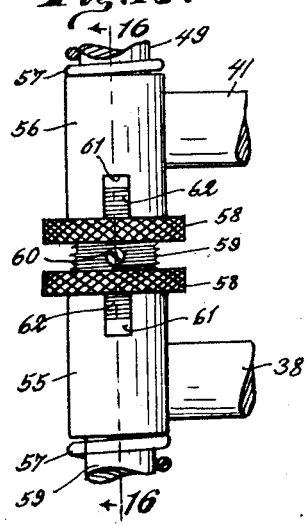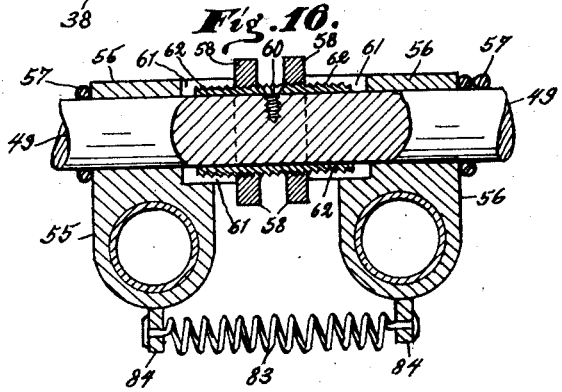

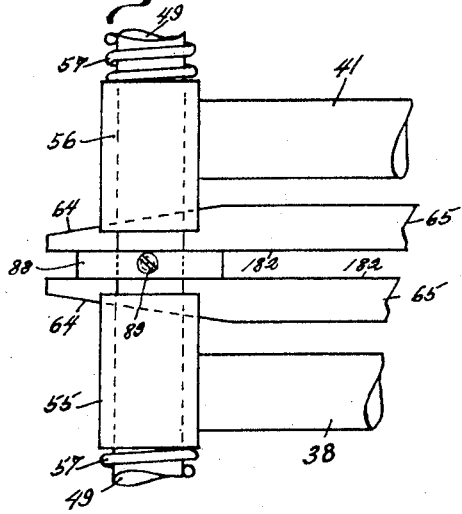
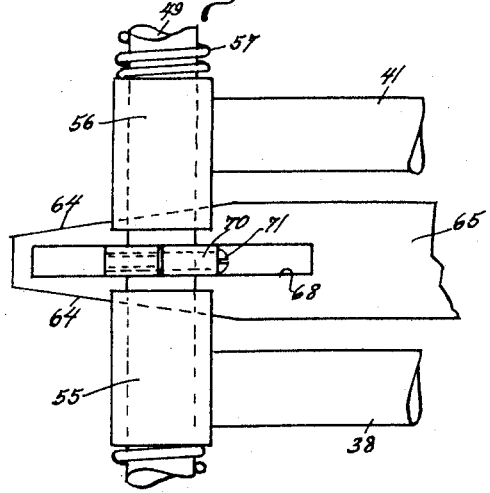
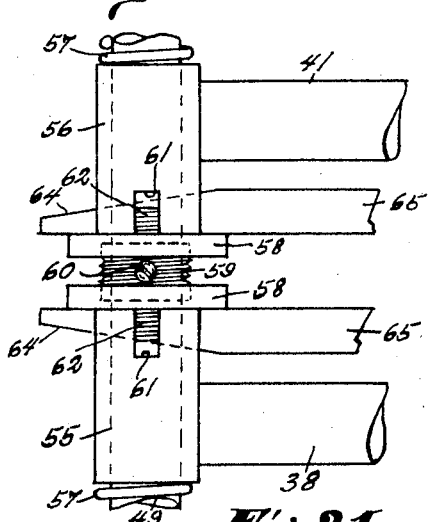
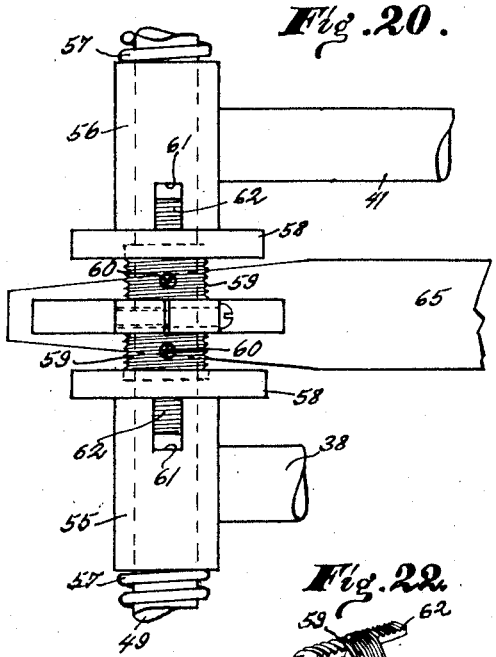
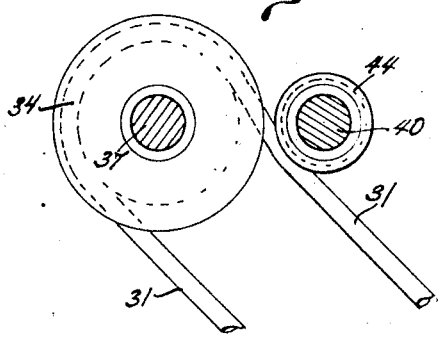
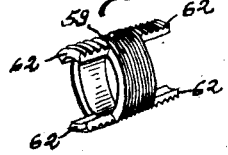

Patented Nov. 5, 1929

1,734,494

UNITED STATES PATENT OFFICE

ALFRED A. KOHLMILLER, OF LOS ANGELES, CALIFORNIA

MACHINE FOR SHARPENING BLADES

Application filed July 30, 1927. Serial No. 209,406.

This invention relates to a machine for simultaneously sharpening a plurality of blades, particularly safety razor blades, and the invention consists in the improved construction, combination and arrangement of parts whereby a machine is provided that can be operated by a relatively unskilled operator to quickly and efficiently sharpen a plurality of blades; and in connection therewith I provide adjustments for the sharpening rolls as well as the blade holders that can also be operated by relatively unskilled help to adjust the parts toward or from a line or vertical plane to more or less than a thousandth part of an inch.

To that end I provide a machine having pairs of rolls for grinding, honing and stropping, with blade holders each adapted to hold a plurality of blades arranged end to end so that the edges of the blades are in a perfectly straight line, with means in connection therewith for raising or lowering the aligned blades; and with other means in connection therewith for adjusting the pairs of grinding, honing and polishing roll toward or from the blades to a fraction of one-thousandth of an inch; and in the adjustment of the rolls either or both ends of the rolls of each pair can be moved more or less than one-thousandth of an inch, or a single roll can be adjusted independently of the other roll, or one end of a roll may be adjusted independently of its other end.

Also the razor blades are adjustable upward or downward relative to predetermined positions between the respective rolls, and also means are provided for raising or lowering either end of the blade holders independently of the other end.

In other words I provide means for adjusting each pair of rolls toward a vertical plane between them; and also adjusting the safety razor blades up or down in the plane so that the edges of the plurality of blades in a holder are aligned and engaging one or the other of the pairs of rolls adjacent the under line of intersection or overlapping.

The purpose of this wide range of adjustment of both the razor blade holders and their respective pair of rolls is to provide a positive means for altering the position of the various parts to less than a thousandth of an inch, which is necessary in order to simultaneously and satisfactorily sharpen a plurality of razor blades that will be finished alike and edged so that each will cut a hair, which is the usual test of a satisfactorily sharpened blade.

Another object of the invention is to provide a machine that can be operated successfully on substantially all kinds of safety razor blades. As is well known safety razor blades are made in various widths and lengths, and also they range in thickness from six to fifteen-thousandths of an inch; so that by the adjustments hereinbefore mentioned the machine can be easily, quickly and accurately adjusted by a relatively unskilled operator to sharpen the various sized blades.

Another object of the invention is to provide means for compensating for the wear and also uneven wear of the rolls and to evenly and accurately adjust them toward one another as they are worn away. That is the rolls are formed of material that wears away in use and they are mounted so that the rolls of each pair can be adjusted toward one another as they wear, and in the event there is an unevenness in the wear toward one end or the other of a roll, the bearings of that roll can be adjusted to align the rolls with the edges of the razor blades or so the worn roll will engage all the blades alike.

Features of invention are shown in the construction, combination and arrangement of the parts whereby a machine for sharpening razor blades is provided that is simple to construct, assemble, adjust and operate, that is strong and durable in use, pleasing in appearance and effective in operation.

Another feature of the invention is shown in the novel mounting and adjustment of the bearings for the rolls; and also in the means for preventing vibration of the pairs of rolls when in use.

Another feature of invention is shown in the combination of the wedge bar and knurled nuts for adjusting the bearings.

Another feature of invention is shown in the mounting and operation of the wedge bars and means for centralizing them in their respective vertical planes, in connection with which the blade holders are also centralized in the vertical planes as well as being therein adjustable.

Other objects, advantages and features of invention may appear from the accompanying drawings, the subjoined detailed description and the appended claims.

The accompanying drawings illustrate the invention.

Figure 1 is a plan view of a razor blade sharpening machine that is constructed in accordance with this invention and showing three sets of rolls that are respectively for grinding, honing and stropping the razor blades. Fig. 2 is a fragmental longitudinal section on line 2—2 of Fig. 1. Fig. 3 is a fragmental plan view of two sets of bearings and a wedge for adjusting the bearings toward or from one another. Fig. 4 is an enlarged longitudinal section on line 4—4 of Fig. 3. Fig. 5 is an enlarged fragmental section on line 5—5 of Fig. 4, showing a detail of a pair of bearings for a pair of rolls and means for adjusting them toward or from one another. Fig. 6 is an enlarged fragmental section on line 6—6 of Fig. 4, showing a detail of the means for moving the wedge bar to adjust the bearings toward or from one another. Fig. 7 is a fragmental plan view of a set of rolls diagrammatically indicated and showing a number of razor blades with their edges aligned in a plane on line a—a and, also showing the bearings, in which the rolls are journaled, and also showing means for adjusting them. Fig. 8 is a greatly enlarged diagrammatic view of a safety razor blade in end and side elevation demonstrating the difference in the tangential angles to which the pairs of rolls are adjusted for grinding, honing and stropping the blades. Fig. 9 is a semi-diagrammatic end view of a pair of rolls showing the difference in their tangential angles as adjusted for grinding, honing and stropping, and also showing vertical planes b—b, c—c, and d—d in which the razor blades are adjustably secured for sharpening.

Fig. 10 is a fragmental sectional end view of a set of rolls showing safety razor blades held in position for stropping and also showing a means for yieldably holding the lower ends of the bearings toward one another to prevent vibration. Fig. 11 is a fragmental section on line 11—11 of Fig. 10, showing a detail of the means for raising or lowering the safety razor blades in vertical planes as indicated by lines b—b, c—c and d—d in Fig. 9. Fig. 12 is a fragmental diagrammatic plan view of a set of rolls showing a pair of fixed bearings and also a pair of movable bearings adjustable by knurled nuts towards or from the fixed bearings. Fig. 13 is another diagrammatic plan view analogous to Fig. 12 showing a pair of fixed and loose bearings with the loose bearings adjustable by a wedge bar. Fig. 14 is still another view analogous to Fig. 12 showing the bearings for the rolls adjustable by both a wedge bar and knurled nuts. Fig. 15 is a plan view of a pair of loosely mounted bearings between which a pair of knurled nuts is interposed for adjusting them. Fig. 16 is a fragmental section on line 16—16 of Fig. 15, showing the bearings for rolls adjustable with a pair of knurled nuts and also showing a yielding means for holding the lower parts of the bearings toward one another to prevent vibration. Fig. 17 is a diagrammatic plan view of a pair of the bearings for a pair of rolls with two wedge bars interposed between the bearings for adjusting them. Fig. 18 is another diagrammatic plan view of a pair of bearings for a pair of rolls showing a compound wedge bar interposed between the bearings for adjusting them. Fig. 19 is a diagrammatic plan view of a pair of bearings for a pair of rolls showing two wedge bars and two knurled nuts interposed between the bearings for adjusting them. Fig. 20 is another diagrammatic plan view of a pair of bearings for a pair of rolls showing a compound wedge bar and two knurled nuts interposed between the bearings for adjusting them. Fig. 21 is a fragmental cross section on line 21—21, Fig. 1, parts omitted, showing a driving pulley and idler engaging the driving belt that is adapted to prevent vibration of the rolls when in use. Fig. 22 is a perspective view of the mutilated threaded sleeve on which the knurled nuts are adjustable.

The machine for sharpening safety razor blades includes a lower deck 25 on which a motor 26 is mounted, and this motor is connected by a belt 27 with a drive pulley 28 on a shaft 29 shown by dotted lines in Fig. 1. Pulleys 30 are mounted on the shaft 29 and carry the respective belts 31, 32 and 33 that are arranged to drive pulleys 34, 35 and 36 secured to the spindle ends of the respective rollers 37, 38 and 39 that are arranged parallel to and in pairs with the rolls 40, 41 and 42, see Fig. 1.

Pairs of meshing spur gears 43 are secured to the spindles of the pairs of rolls 37—40, 38—41 and 39—42 so that when the shaft 29 is actuated the pairs of rolls will be actuated in the direction of the curved arrows in Fig. 10.

In order to stabilize the rolls and prevent chattering of the meshing spur gears a rubber sheave pulley 44 is secured on the spindles of the respective rolls 40, 41 and 42 and arranged so they will engage their respective driving belt as best shown in Fig. 21.

The construction and arrangement of the parts on the lower deck are shown in my prior patent application for Blade sharpening machine, filed March 19, 1925, Serial Number 16,738 and are, therefore, not shown in detail in this case. On the upper deck 45, pairs of posts 46 are secured by screws 47 and they are arranged at the front and rear of the deck and aligned and provided with bearings for rods 48—49. Also these rods are additionally supported by end supports 50 that are connected by stabilizing rods 51, see Fig. 1, and the rods 48—49 are secured from endwise movement by set screws 52 that extend through the bearings on the posts 46 and supports 50.

Each pair of rolls is mounted substantially alike but they perform different functions in the sharpening of razor blades. The short rolls 37—40 are commonly termed "grinders" that have their helices formed of material suitable for grinding steel blades, and these rolls are used to first treat the razor blades to concave or re-bevel the rough edges. Then the blades are transferred to the rolls 38—41 where they pass through a semi-finishing process of honing, after which they are passed into the rolls 39—42, where they are stropped or the sharpening is completed.

As stated, each set of rolls is mounted and adjusted substantially alike so that a description of the mounting and adjustment of one set of rolls will describe all.

As shown in Fig. 1, the oppositely arranged bearings 53—54 at the front of the machine and 55—56 at the rear thereof are loosely mounted on the rods 48—49 and are normally pressed toward one another by springs 57 that are interposed between the bearings and the adjustable knurled nuts 58 on the threaded mutilated sleeves 59 secured to the rods 48—49 by pins or screws 60. The sets of bearings 53—54, 55—56 are slotted at 61 to provide space for the oppositely arranged extensions 62 on the mutilated threaded sleeves 59, as best shown in Figs. 19, 20 and 22.

Referring now to Figs. 2 to 6, inclusive, it will be seen that the two sets of bearings 53—54, 55—56 are arranged to engage wedge surfaces 63—64 of a slide bar 65 that passes centrally through slots 56 in the rods 48—49. The slots 66 are considerably wider that the bar 65 so that when it is actuated to drive the wedges through the rods 48—49 in a direction to separate the bearings, they can move the full width of the wedges; and when the bar 65 is moved in the other direction the bearings can move a considerable distance toward one another. The bar 65 between the wedges is provided with elongated slots 67—68 to provide clearance for the front and rear guides 69—70. These guides are substantially the width of the slots 67—68, or slidingly fit therein. The guides 69 and 70 are split and recessed to fit over the rods 48, 49 and are secured thereto by a pair of set screws 71. These guides are substantially alike except that the front guide 69 is provided with an extension 72 having a forked slot 73 that is adapted to guide the upper end of a razor blade holder 74, shown best in Figs. 2, 4 and 10. The construction of razor blade holder 74 is old and is, therefore, not described in detail.

The bars 65 at their forward ends are provided with bosses 75 through which the stems 76 of screws 77 are extended and secured by pins 78 to knurled nuts 79. The screws 77 have small shoulders 80 arranged to engage the bosses 75 so that the screws can rotate in the bosses but are not movable endwise when the nuts 79 are rotated to move the wedge bars 65 to separate the sets of roll bearings or to permit them to be moved closer together by the springs 57. The screws 77 are arranged to lie parallel with the bars 65 and extend through a threaded opening 81 in the guides 69, so that when the nuts 79 are turned in either direction the guides 69—70 being fixed on the rods 48, 49 will cause the bars to be moved in one direction or the other and when so moved the bearings for the sets of rolls will be moved on the rods 48, 49 either toward or away from one another. It is understood, of curse, that the bars 65 are operated independently of one another.

From the foregoing it will be seen that the movement of the bar 65 to force the wedges between the bearings will separate them and thereby cause a less overlapping of the rolls and when moved in the opposite direction the tension of springs 57 will cause the bearings to come closer together to correspondingly move the rolls to increase their overlap; also it can be seen that a very fine and accurate adjustment of the rolls can be made. However, in many cases it is found advisable to have one bearing adjustable independently of another bearing to compensate for an uneven wearing of the rolls. In other words, if one roll adjacent either end is formed of softer material than the balance of the roll and wears away quickly, it will be necessary to adjust one bearing to compensate for such wear and such an adjustment is shown in Figs. 12 to 20, respectively.

As seen in Fig. 12, the bearings 54, 56 of the roll 41 are secured in a relatively fixed position by set screws 82 but can be adjusted longitudinally of the rods 48, 49 by loosening the set screws; and the bearings 53, 55 of the roll are loose on the rods 48, 49 and are pressed against the knurled nuts 58 by springs 57 so that they are independently adjustable longitudinally of the rods by manipulation of the nuts 58.

In Fig. 13 the same construction and arrangement of the parts are shown and in the same order, except that I employ a single wedge bar 65 to adjust the bearings 53, 55 of the roll 38. That is the wedge bar 65 is provided with a straight edge 182 that is arranged to slide on the ends of the bearings 54, 56, but is provided with wedge surfaces 63, 64 that engage the ends of the bearings 53, 54 and move them when the wedge is manipulated as hereinbefore described.

In Fig. 14 both sets of bearings are loosely mounted on the rods 48, 49 and press toward a common plane by springs 57. As seen therein a mutilated screw sleeve 59, shown also in Fig. 12, is secured by set screws 60 to each of the rods; and the bearings 54, 56 loosely engage these sleeves 59. Knurled nuts 58 are mounted on the screw sleeves and are arranged so that they engage the straight edge 182 of the wedge bar 65 so that by manipulating these nuts either or both ends of the wedge bar can be adjusted, and as previously stated the adjustment of the bearings toward or from one another may be less than one thousandth of an inch.

In Figs. 15, 16 this adjustment of the bearings is accomplished without the use of the wedge bar 65, and as seen therein a single threaded sleeve 59 is secured between each set of bearings and two knurled nuts 58 are mounted on the sleeve and arranged to move the bearings as may be desirable.

Also in Fig. 16 a spring 83 secured to lugs 84 on the bearings 55, 56 is shown that is adapted to yieldingly hold the bottom of the bearings toward one another. These springs 83 are employed between each of the rear pairs of bearings for stabilizing them so as to prevent excessive vibration. The front pairs of bearings, however, are provided with pais of springs 85 that are inclined downwardly from lugs 86 toward a common center near which they are secured to the upper deck 45 by eye-bolts 87, as best shown in Fig. 10.

In Fig. 17 the adjustment of the rolls is accomplished with a pair of wedge bars 65 that have straight edges 182 engaging a guide 88 secured by a set screw 89 to the rod 49 so that when one or both of the wedges are actuated one or both sets of bearings will be moved toward or from the springs 57; it being understood, of course, that the mounting and adjustment of the bearings at the rear and front of the machine are substantially the same.

In Fig. 18 an enlarged plan view analogous to a plan of the rear set of bearings in Fig. 3 is shown and as seen therein the bearings 55, 56 are loosely mounted on the rod 49 and are arranged to engage the wedge surfaces 64 on the wedge bar 65; and this bar is guided in its reciprocation by a split guide 70 secured to the rod 49, the guide being arranged to extend through a slot 68 arranged centrally between the wedge surfaces 64.

In Fig. 19 a pair of single wedge bars 65, a single screw sleeve 59 and a pair of knurled nuts 58 are employed for adjusting the set of rear bearings 55, 56, it being understood that the front bearings 53, 54 are also so adjusted.

In Fig. 20 the pair of bearings 55, 56 is adjusted by a single wedge bar 65, and a pair of knurled nuts 58 on threaded sleeves 59.

From the foregoing it can be readily seen that each of the bearings either singly or in pairs can be adjusted more or less toward or from vertical planes indicated by dotted lines $b$—$b$, $c$—$c$ and $d$—$d$ in Fig. 9; and the adjustment can be less than one thousandth of an inch.

Referring now to Figs. 2, 7, 10 and 11 it will be seen that I employ a blade holder 74 that is adapted to hold a plurality of safety razor blades 90; this holder, as stated, is old and is therefore not shown or described in detail, it being understood that when filled with blades the exposed edges thereof are held in a nearly true alignment that is made substantially perfect when the blades are sharpened.

The base of the holder 74 is adapted to be removably inserted in a trough 91 secured in a pair of posts 92 that are adjustable upward or downward through sleeves 93 by wedge surfaces 94 on a wedge bar 95. This bar is adapted to be moved back and forth by a screw 96 mounted in a bracket 97 that is secured to the deck 45. When the screw 96 is turned so as to drive the bar 95 toward the rear of the machine the wedges will lift the post 92 against opposing springs 98 interposed between disks 99 and the bottom ends of the sleeves 93, the sleeves being held stationary by adjusting screws 100, 101, and when moved in the other direction the springs force the post down.

From the foregoing it can be easily seen that the blade holder support is adjustable so that either the front or rear ends can be raised and lowered independently, but also the blade holders can be adjusted upward or downward relative to the pairs of rolls.

By the foregoing means the razor blades are adjustable and centralized in vertical planes between the pairs of rolls and sharpened, as best illustrated in Figs. 8 and 9.

Each pair of rolls is arranged to overlap more or less; hence the tangential angles of the pairs of the series will be gradually greater and their grinding action will finish gradually a smaller portion of the blade edges. Thus the grinding rolls on opposite sides of the vertical plane, illustrated by line $b$—$b$, Fig. 9, form a small tangential angle which enables the rolls 37—40 to hollow grind the sides of the blades for a considerable width marked "grinding" in Fig. 8.

The pairs of rolls 38, 41 overlap more than the grinding rolls 37, 40 so that their tangential angle is greater and they will grind the blades for only about half the width ground by the previous pairs of rolls, as shown in Fig. 8, and their grinding surface is marked "honing", and these rollers 38, 41 are adjustable relative to the vertical plane illustrated by line $c$—$c$, Fig. 9.

The pairs of rolls 39, 42 are adjustable relative to a vertical plane illustrated by the line d—d; and are arranged to overlap still more than the rolls 38, 41, and their tangential angle is still greater, so that they treat the blades near their edges for only a slight width illustrated in Fig. 8, in which the width of the surface treated is designated "stropping".

Thus it is seen that in sharpening the razor blades the rolls are adjustable toward or from vertical planes between the rolls; and the razor blade holders are adjustable upward or downward in these planes to effect, successively, first a grinding, then a honing, and a final stropping.

The operation of the machine will now be described. The rolls are adjusted with reference to each other as illustrated in the drawings, particularly in Figs. 9, 12 to 20.

As seen in Fig. 9 the grinding rolls 37, 40 very slightly overlap each other tangentially and this leaves a sharp tangential angle between the rolls indicated by the dotted lines 102, 103 and, therefore, permits the razor blades 90, best shown in Figs. 2, 7 and 10, to extend relatively far up toward the line which bisects the rolls. This causes a wide grind on each side of the blades, as indicated in Fig. 8, so that relatively deep wide surfaces or concave bevels are ground on each side of the blades. This wide surface is indicated by the bracket in Fig. 8 marked "grinding". This is the first and major grinding action of the machine on the razor blades and as illustrated the grind is relatively far down on the blades for a considerable width and concave.

The grinding rolls 37, 40 are relatively short and in operation the blade holder is moved back and forth while the rolls operate until the blades are sufficiently ground. Then the razor blades still in the holder are transferred to the second pair of rolls 38, 41 that are set so that they envelop more than the rolls 37, 40, and their tangential angle indicated by dotted lines 104, 105, Fig. 9, is much greater than the angle between the rolls 37, 40. This set of rolls is used for honing the razor blades and, therefore, their action is confined more toward the edges of the blades or touch about one-half of the surface engaged by the grinders.

After the razor blades have been properly honed they are transferred to the rolls 39, 41 which are arranged to overlap still more than the honing rolls 38, 41, and their tangential angle indicated by the dotted lines 106, 107 is still greater than the other tangential angles. These rolls 39, 41 engage about one-fourth of the surfaces engaged by the grinder rolls as illustrated in Fig. 8. These rolls are for a final treatment or stropping of the razor blades.

It is understood that the holders are slightly lowered by means of the wedge bar 95 before they are inserted between the pairs of rolls and are then adjusted by means of the screw 96 until they are in position to be properly ground, honed and stropped.

I claim as my invention:

1. A machine for shapening blades including supports, parallel rods secured in said supports, pairs of bearings slidably mounted on said rods; stabilizing springs connected to the under side of each pair of bearings for stabilizing them, other springs mounted on said rods for forcing the bearings of each pair of rolls toward one another, pairs of rolls having their ends journaled into said bearings and wedge bars passing through slots in said rods and interposed between the bearings of each pair of rolls, said bars movable to separate the bearings or to permit them to be forced near one another by said springs.

2. The combination set forth in claim 1 and threaded sleeves on said rods; and nuts on said sleeves that are adapted to be manipulated to increase or decrease the tension on said springs.

3. A machine for sharpening blades including supports, parallel slotted rods secured in said supports, wedge bars extending through the slots in said rods and having wedge surfaces thereon, pairs of bearings loosely mounted on said rods and arranged to engage the wedge surfaces on said bars, pairs of rolls having ends journaled into said pairs of bearings, threaded sleeves secured to said rods, nuts on said sleeves, and springs interposed between said bearings and nuts.

4. The combination set forth in claim 3, and means for centralizing said wedge bars in vertical planes.

5. A machine for sharpening blades including supports, parallel slotted rods secured in said supports, slotted wedge bars extending through the slots of said rods and having wedge surfaces, wedge bar guides extending through the slots of said bars and secured to said rods to centralize said bars in vertical planes, pairs of bearings loosely mounted on said rods and arranged to engage the wedge surfaces of said bars, pairs of rolls having ends journaled into said pairs of bearings, threaded sleeves secured to said rods, nuts on said sleeves, and springs interposed between said bearings and nuts.

6. The combination set forth in claim 5, and blade holders adjustable upward or downward in the vertical planes in which said wedge bars are centralized, and means for reciprocating said bars endwise for the purpose specified.

7. The combination set forth in claim 5, and stabilizing means for preventing vibration of said pairs of bearings, blade holders adjustable upward or downward in the vertical planes in which said bars are centralized, blade holder guides connected to said bar guides, and means for reciprocating said bars endwise for the purpose specified.

8. The combination set forth in claim 5, and stabilizing means for preventing vibration of said pairs of bearings, blade holders adjustable upward or downward in the vertical planes in which said bars are centralized, blade holder guides integral with said wedge bar guides, screws for reciprocating said wedge bars endwise, and means for driving said pairs of rolls.

In witness whereof, I have hereunto affixed my signature.

ALFRED A. KOHLMILLER.